United States Patent
Maier

(10) Patent No.: US 8,952,649 B2
(45) Date of Patent: Feb. 10, 2015

(54) EFFICIENCY BASED STAND-BY MODE FOR FUEL CELL PROPULSION SYSTEMS

(75) Inventor: Oliver Maier, Worms (DE)

(73) Assignee: GM Global Technology Operations LLC, Detroit, MI (US)

( * ) Notice: Subject to any disclaimer, the term of this patent is extended or adjusted under 35 U.S.C. 154(b) by 374 days.

(21) Appl. No.: 13/527,378

(22) Filed: Jun. 19, 2012

(65) Prior Publication Data

US 2013/0335000 A1 Dec. 19, 2013

(51) Int. Cl.
*G06F 17/50* (2006.01)

(52) U.S. Cl.
USPC ............ 320/101; 429/400; 429/535; 903/908

(58) Field of Classification Search
USPC ...................... 320/101; 429/40, 535; 903/908
See application file for complete search history.

(56) References Cited

U.S. PATENT DOCUMENTS 7,059,436 B2 * 6/2006 Iwasaki ..................... 429/430
8,384,342 B2 * 2/2013 Hasegawa .................. 320/101

\* cited by examiner

*Primary Examiner* — Nghia Doan
(74) *Attorney, Agent, or Firm* — John A. Miller; Miller IP Group, PLC

(57) ABSTRACT

A system and method for operating a fuel cell system in a stand-by mode. The method includes determining a power limit value based on fuel cell stack and battery power optimization, where if a system power request falls below the power limit value the system will enter the stand-by mode. The system first enters a dynamic stand-by mode where the fuel cell stack is turned off and a compressor providing cathode air to the cathode side of the stack is operated at an idle speed. The method accumulates a compressor power value identifying how much energy has been consumed by operating the compressor at the idle speed during the dynamic stand-by mode, and then switches to a static stand-by mode where the compressor is turned off when the accumulated compressor power value reaches a compressor restart energy value that identifies how much energy it takes to start the compressor.

20 Claims, 2 Drawing Sheets

EFFICIENCY BASED STAND-BY MODE FOR FUEL CELL PROPULSION SYSTEMS

BACKGROUND OF THE INVENTION

1. Field of the Invention

This invention relates generally to a system and method for operating a fuel cell system in a stand-by mode and, more particularly, to a system and method for operating a fuel cell system in a stand-by mode that includes determining when to enter the stand-by mode based on an optimization between fuel cell stack power and battery power and then providing a dynamic stand-by mode operation where the fuel cell stack is shut off and the cathode compressor operates at an idle speed until a calculated time has elapsed and then providing a static stand-by mode where the compressor is not operating.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. A typical cathode compressor will include air bearings. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Most fuel cell vehicles are hybrid vehicles that employ a supplemental power source in addition to the fuel cell stack, such as a high voltage DC battery or an ultracapacitor. A bi-directional DC/DC converter is sometimes employed to match the battery voltage to the voltage of the fuel cell stack. The power source provides supplemental power for the various vehicle auxiliary loads, for system start-up and during high power demands when the fuel cell stack is unable to provide the desired power. The fuel cell stack provides power to an electrical traction motor through a DC high voltage electrical bus for vehicle operation. The battery provides supplemental power to the electrical bus during those times when additional power is needed beyond what the stack can provide, such as during heavy acceleration. For example, the fuel cell stack may provide 70 kW of power, however, vehicle acceleration may require 100 kW of power. The fuel cell stack is used to recharge the battery or ultracapacitor at those times when the fuel cell stack is able to provide the system power demand. The generator power available from the traction motor during regenerative braking is also used to recharge the battery or ultracapacitor.

It is necessary to provide control algorithms on a fuel cell hybrid vehicle to determine how much power will be provided by the fuel cell stack and how much power will be provided by the battery in response to a driver power request and under all vehicle operating conditions. It is desirable to optimize the power distribution provided by the fuel cell stack and the battery so that the amount of hydrogen used to operate the vehicle is minimized. In other words, it is desirable to operate the fuel cell system in the most efficient manner that allows the vehicle to travel the farthest distance using the least amount of hydrogen. The battery must be operated within a defined state-of-charge (SOC) range, where the control algorithms typically provide a SOC set-point to which the battery charge and discharge is controlled based on that set-point.

When a fuel cell system on a vehicle is in an idle mode, such as when the vehicle is stopped at a stop light, where the fuel cell stack is not generating power to operate system devices, air and hydrogen are generally still being provided to the fuel cell stack, and the stack is generating output power. This power is typically used to recharge the battery until an upper SOC limit of the battery is reached, where if the battery is charged beyond this upper limit, the battery may be damaged. When this SOC limit is reached, the battery load on the stack is removed, which increases the stack voltage, but causes certain phenomenon that decrease the life of the stack. If the fuel cell system is turned off during the idle condition, then the problem of providing a load on the stack when the battery has reached its maximum SOC does not need to be addressed. Also, providing hydrogen to the fuel cell stack when it is in the idle mode is generally wasteful because operating the stack under this condition is not producing very much useful work, if any.

For these and other fuel cell system operating conditions, it may be desirable to put the system in a stand-by mode where the system is consuming little or no power, the quantity of hydrogen fuel being used is minimal and the system can quickly recover from the stand-by mode so as to increase system efficiency and reduce system degradation. U.S. patent application Ser. No. 12/723,261, titled, Standby Mode for Optimization of Efficiency and Durability of a Fuel Cell Vehicle Application, filed Mar. 12, 2010, assigned to the assignee of this application and herein incorporated by reference, discloses one process for putting a fuel cell system on a vehicle in a stand-by mode to conserve fuel.

SUMMARY OF THE INVENTION

In accordance with the teachings of the present invention, a system and method are disclosed for operating a fuel cell system in a stand-by mode. The method includes determining a power limit value based on fuel cell stack and battery power optimization, where if a system power request falls below the power limit value the system will enter the stand-by mode. When the power request falls below the power limit value, the system first enters a dynamic stand-by mode where the fuel cell stack is turned off and a compressor providing cathode air to the cathode side of the stack is operated at an idle speed. The method accumulates a compressor power value identifying how much energy has been consumed by operating the compressor at the idle speed during the dynamic stand-by mode, and then switches to a static stand-by mode where the compressor is turned off when the accumulated compressor power value reaches a compressor restart energy value that identifies how much energy it takes to start the compressor.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for operating a fuel cell system in a stand-by mode that includes both optimization of stack and battery power and control of cathode compressor is merely exemplary in nature, and is in no way intended to limit the invention or its applications or uses. For example, the present invention has application for a fuel cell system on a vehicle. However, as will be appreciated by those skilled in the art, the present invention may have application for other fuel cell systems that are not on vehicles.

Figure 1:
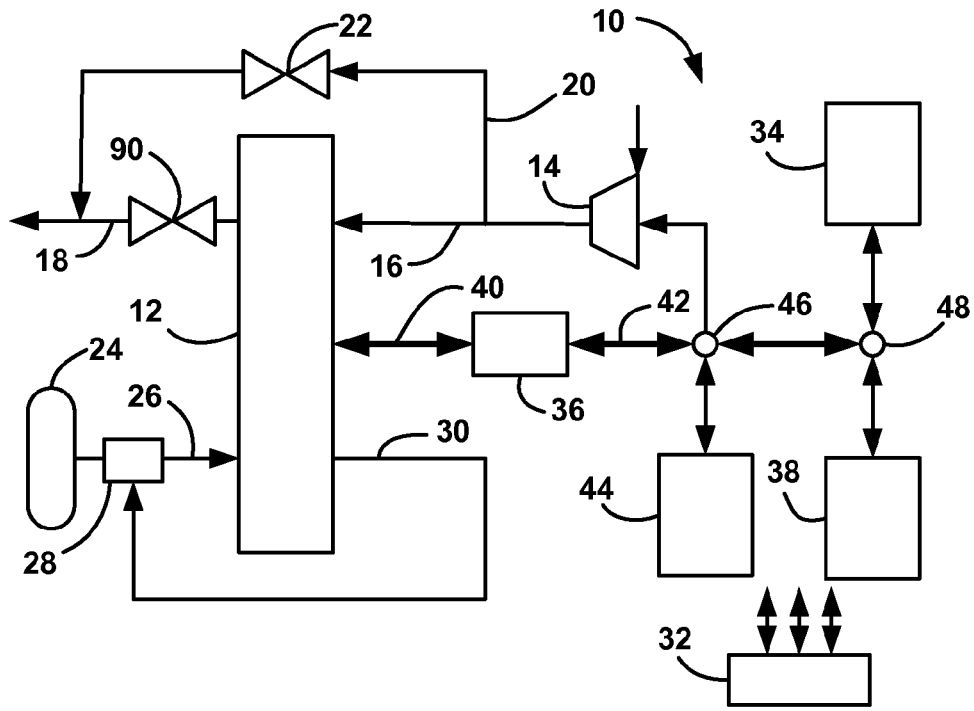
FIG. 1 is a simplified block diagram of a fuel cell system.

FIG. 1 is a block diagram of a fuel cell system 10 including a fuel cell stack 12. The fuel cell stack 12 includes a cathode side that receives cathode air from a compressor 14 on a cathode input line 16. The compressor 14 can be any compressor suitable for the purposes described herein, and typically will be a compressor that employs air bearings. The cathode side exhaust is output from the fuel cell stack 12 on a cathode output line 18 through an exhaust valve 90. A by-pass line 20 including a by-pass valve 22 is provided to allow air from the compressor 14 to be directed around the stack 12 during various system operating conditions, such as during a stand-by mode discussed in more detail below. When the by-pass valve 22 is open and the output valve 90 is closed, the cathode air travels around the stack 12 instead of flowing through the stack 12.

The fuel cell system 10 also includes a hydrogen source 24 that provides hydrogen gas to an injector 28 that injects the gas into the anode side of the fuel cell stack 12 at a controlled pulsed duty cycle on an anode input line 26. The anode side exhaust is output from the fuel cell stack 12 on anode recirculation line 30 that recirculates the anode exhaust gas back to the anode input line 26 through the injector 28, which could also operate as an ejector, as would be well understood by those skilled in the art.

The fuel cell system 10 also includes a high voltage battery 34 that can be any suitable rechargeable battery system that provides various desirable charging and discharging characteristics for fuel cell system applications, including, but not limited to, lithium-ion batteries, Ni-MH batteries, sodium-nickel-chloride batteries, lead-acid batteries, nickel-cadmium batteries, etc. Although the battery 34 is employed in this non-limiting embodiment as a supplemental power source, other high voltage DC storage devices can be employed instead of the battery 34, such as an ultracapacitor.

The fuel cell stack 12 and the battery 34 may have different output voltages depending on their design and the load current. A DC/DC boost converter 36 provides voltage matching between the stack 12 and the battery 34, and provides current control that selectively determines how much power is provided by the stack 12 to drive the various system loads and an electric traction motor 38 for the changing fuel cell system operating conditions and driver power requests.

In this non-limiting design, the fuel cell stack 12 is electrically coupled to the DC/DC boost converter 36 by a stack bus 40 and the DC/DC boost converter 36 is electrically coupled to the high voltage battery 34 by a high voltage bus 42. The various high voltage components of the system 10 are electrically coupled to the high voltage bus 42 between the boost converter 36 and the battery 34. Particularly, the compressor 14 and miscellaneous system loads 44 are electrically coupled to the high voltage bus 42 at node 46. Further, the electric traction motor 38, along with the high voltage battery 34, are electrically coupled to the high voltage bus 42 at node 48. A system controller 32 controls the fuel cell system 10 and includes algorithms for providing power optimization and stand-by mode control consistent with the discussion herein.

U.S. patent application Ser. No. 13/396,145, titled, Analytic Method of Fuel Consumption Optimized Hybrid Concept for Fuel Cell Systems, filed Feb. 14, 2012, assigned to the assignee of this application and herein incorporated by reference, discloses a power optimizer that determines how much power is to be provided by the fuel cell stack 12 and how much power is to be provided by the high voltage battery 34 for a particular driver power request so that the amount of hydrogen that is consumed is minimized. The power optimizer is based on efficiency tables for the fuel cell stack 12 and the high voltage battery 34. At a given driver power request $P_{Driver,req}$, the optimizer calculates the optimal power distribution between the stack 12 and the battery 34, where the efficiency tables are transformed into polynomial equations. The calculations define the power provided by the stack 12 as a virtual stack hydrogen power $P_{H_2,FCS}$ and the power provided by the battery 34 as a virtual battery hydrogen power $P_{H_2,Bat}$. The polynomial equations are solved to determine a stack power request $P_{FCS,req}$ and then that power is subtracted from the driver power request $P_{Driver,req}$, including other factors, to obtain a battery power request $P_{Bat,req}$.

The present invention proposes an efficient stand-by mode for the fuel cell system 10. The system 10 can be put into the stand-by mode when certain requirements and entrance criteria have been met, such as those discussed in the '261 application referenced above. Those entrance criteria may include, for example, battery SOC, driver power request, ignition key position, etc. Once the entrance criteria for the stand-by mode have been met, the system controller 32 then determines whether the stand-by mode should be entered based on a calculated power optimization between the stack and battery power, basically whether the fuel cell stack 12 should continue to provide power to charge the battery 34 so that it is at a desired SOC level. In other words, the system controller 32 first determines whether all of the necessary requirements for entering the stand-by mode have been met, and if so, then uses, for example, the power optimization algorithm disclosed in the '145 application to determine whether the fuel cell stack 12 should continue operating or initiate the stand-by mode.

If the controller 32 determines that the stand-by mode should be entered, the controller 32 first operates the system 10 in a dynamic stand-by mode where the compressor 14 remains operating with the by-pass valve 22 in the open position and the output valve 90 in the closed position. In the dynamic stand-by mode, the compressor 14 operates at its idle speed, for example, 30,000 RPMs, but the fuel cell stack 12 is turned off. Because the compressor 14 requires a significant amount of acceleration energy to be restarted, it is more efficient to maintain the compressor 14 rotating at its idle speed in the dynamic stand-by mode for some period of time after the stand-by mode is initiated. In other words, if the compressor 14 is turned off when the stand-by mode is entered, and then the stand-by mode is ended a short time thereafter, the amount of power it takes to restart the compressor 14 is greater than the amount of power saved by turning the compressor 14 off at the start of the stand-by mode.

Based on the speed of the compressor 14, the type of a compressor, etc., a calculation can be made to determine at what time the compressor 14 should be turned off, where keeping the compressor 14 operating would use more energy than what could be saved during the stand-by mode. When the compressor 14 is turned off, the stand-by mode event goes from the dynamic stand-by mode to a static stand-by mode where both the fuel cell stack 12 and the compressor 14 are turned off. The present invention identifies the break-even point of the idle energy of the compressor 14 and compressor restart energy.

By operating the compressor 14 in the dynamic stand-by mode, the compressor 14 can spin up very quickly from the idle speed to a desired speed when a power request is made. However, it takes continuous power to operate the compressor 14 at its idle speed. Further, it is beneficial to operate the compressor 14 at its idle speed because for those compressors that employ air bearings, each time the compressor 14 goes to zero speed, there is friction on the bearings possibly causing damage. Further, when the compressor 14 is not operating, the amount of acceleration energy required to speed up the compressor to its idle speed is significant. While the compressor 14 is operating in the dynamic stand-by mode, benefits will be realized for more aggressive drivers that accelerate from the idle position very quickly because the compressor 14 does not have to increase its speed from zero.

Figure 2:
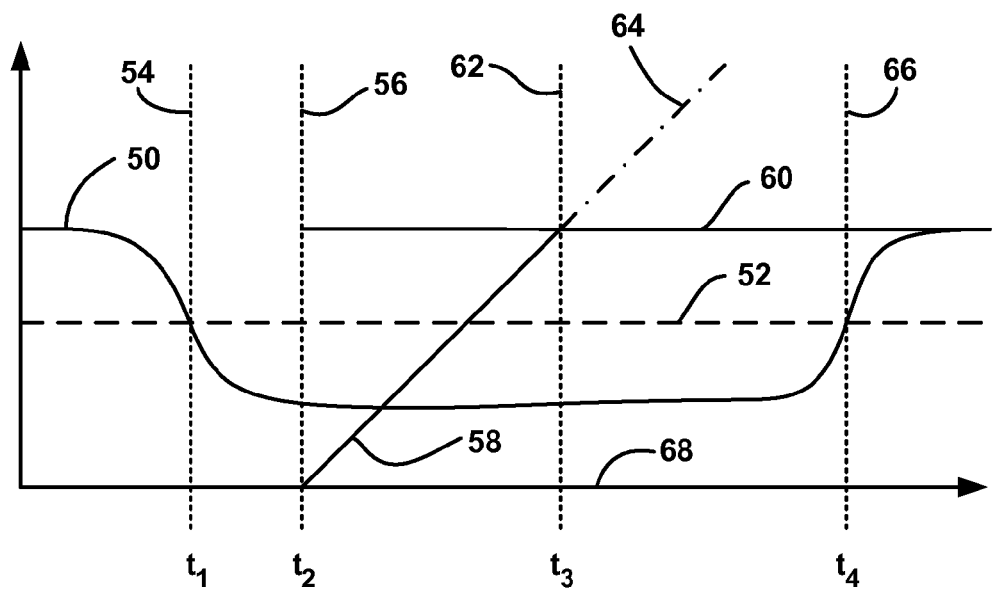
FIG. 2 is a graph with time on the horizontal axis and power on the vertical axis showing various relationships between stack output power and energy conserved during a stand-by mode.

FIG. 2 is a graph with time on the horizontal axis and power and energy on the vertical axis that shows the power relationships discussed above for the stand-by mode. Graph line 50 represents the power requested from the fuel cell system 10 by, for example, the hybrid power optimizer. Line 52 represents a power limit value that identifies the power level where the fuel cell system 10 should be turned off during the idle condition, and where further battery charging is not desirable or possible. Further, as the compressor 14 rotates when the fuel cell stack 12 is turned off, battery power is used to operate the compressor 14 and energy is being consumed. Because battery power is used to operate the compressor 14 during the stand-by mode, it is necessary that the SOC of the battery 34 be above a predetermined SOC limit when the stack 12 is shut down so that operating the compressor 14 and other system devices during the stand-by mode does not cause the battery SOC to fall below the minimum SOC requirement. Line 68 represents the amount of power required to operate the compressor 14 at its idle speed and line 60 represents the acceleration energy required to restart the compressor 14 from zero speed to the idle speed. Line 58 represents the accumulation of the power that conforms to energy to operate the compressor 14 at its idle speed over time.

When the power request starts to fall indicating a potential stand-by mode condition, the power request will eventually reach the power line 52 at time $t_1$ represented by line 54, where the controller 32 will initiate the stand-by mode. The controller 32 allows a certain period of time to go by after the stand-by mode conditions have been met to provide stability, damping and remove the possibility that the power request will immediately return above the power limit line 52. In one non-limiting embodiment, this time is 1-2 seconds. Once this time has gone by at time $t_2$ represented by line 56, the controller 32 then specifically enters the stand-by mode by first operating in the dynamic stand-by mode where the compressor 14 continues to operate at its idle rotation speed.

While the system 10 is operating in the dynamic stand-by mode, eventually the amount of energy consumed by the compressor 14 to rotate at its idle speed will reach the compressor restart acceleration energy at time $t_3$ represented by line 62, where the amount of energy used by the compressor 14 to rotate is equal to the amount of energy that is required to restart the compressor 14 had it been turned off at time $t_2$. At time $t_3$, the controller 32 enters the static stand-by mode, where the compressor 14 is turned off for the remainder of the stand-by mode. Eventually, the power request will increase when the driver exits the idle condition. When the power request reaches the power limit line 52 at time $t_4$ represented by line 66, the stand-by mode will end and the hybrid power optimization control will take over.

By operating the compressor 14 in the dynamic stand-by mode and the static stand-by mode in this manner, the amount of energy represented by the triangle sided by the line 56, the compressor energy line 58 and the compressor restart energy line 60 is the amount of energy that is saved. Line 64 is an extension of the line 58 showing how much energy would be used by the compressor 14 during the static stand-by mode had it not been turned off.

Figure 3:
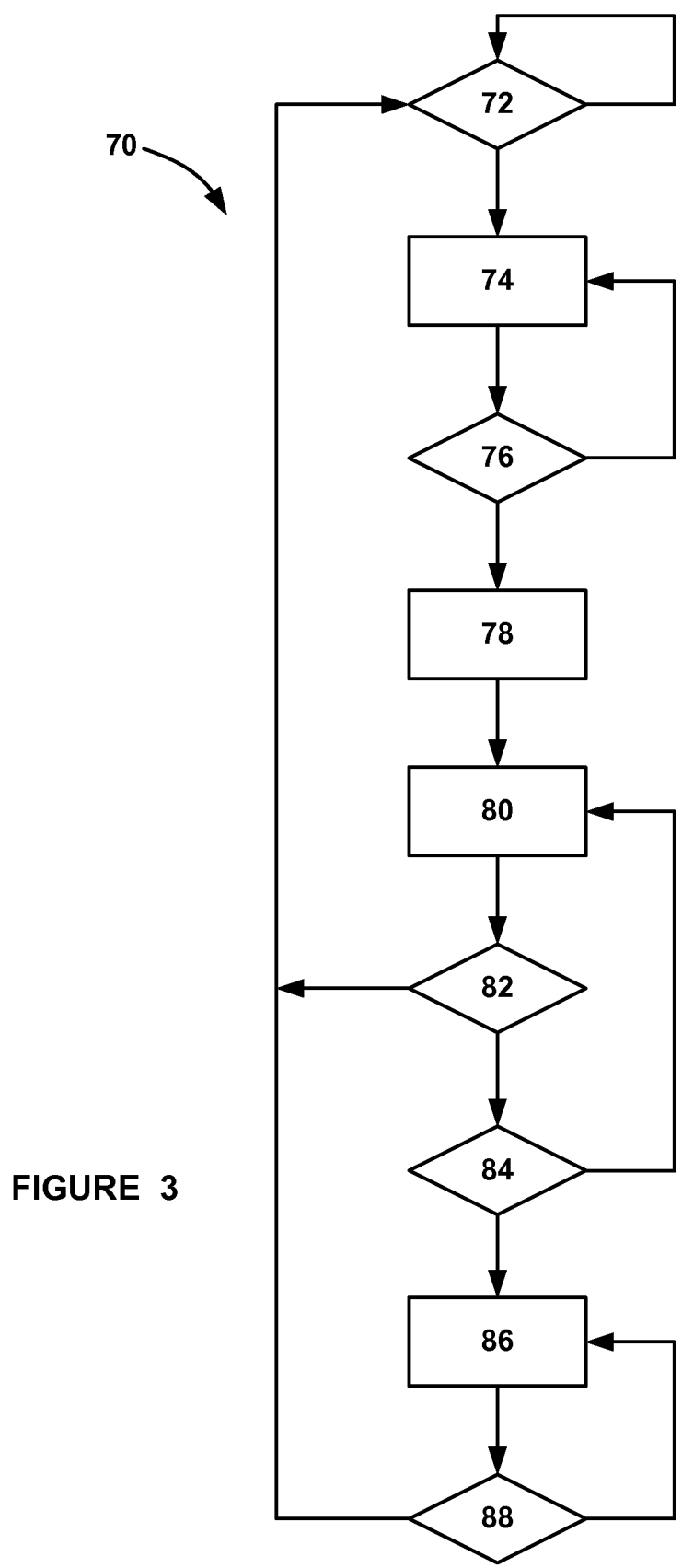
FIG. 3 is a flow chart diagram showing a process for operating the system shown in FIG. 1 in a stand-by mode.

FIG. 3 is a flow chart diagram 70 showing a process for controlling the stand-by mode of the fuel cell system 10 in the manner discussed above. The algorithm monitors the fuel cell system power request to determine if it falls below the power limit line 52 at decision diamond 72. If the power request does fall below the power limit line 52, the algorithm starts a counter at box 74 and determines if the count has reached a predetermined count value at decision diamond 76 to set the delay between times $t_1$ and $t_2$. Once the time has elapsed at the decision diamond 76, the algorithm enters the dynamic stand-by mode at box 78 by turning off the fuel cell system 10, opening the by-pass valve 22, closing the output valve 90 and operating the compressor 14 at its idle speed. The algorithm then accumulates the power to operate the compressor 14 at the idle speed at box 80 and determines whether the requested power has increased to the power limit line 52 at decision diamond 82 and, if so, the algorithm exits the stand-by mode. If the requested power has not increased to the power limit line 52, the algorithm determines whether the accumulated power has reached the compressor restart power value at decision diamond 84. If the accumulated power reaches the compressor restart energy at the decision diamond 84, the algorithm enters the static stand-by mode at box 86 by turning off the compressor 14. The algorithm again monitors whether the requested power has increased to the power limit line 52 at decision diamond 88, and if not, returns to the box 86 to maintain the actual stand-by mode. If the power request does rise to the power limit line 52 at the decision diamond 88, then the algorithm exits the stand-by mode.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for operating a fuel cell system in a system stand-by mode, said method comprising:
    determining a power limit value when a system power request falls below the power limit value the system will enter the system stand-by mode;
    determining that the system power request has fallen below the power limit value;
    entering a dynamic stand-by mode where a fuel cell stack in the fuel cell system is turned off and a compressor providing cathode air to a cathode side of the fuel cell stack is operated at an idle speed;
    accumulating a compressor power value identifying how much energy has been consumed by operating the compressor at the idle speed during the dynamic stand-by mode; and
    entering a static stand-by mode when the accumulated compressor power value reaches a compressor restart energy value that identifies how much energy it takes to start the compressor, wherein entering the static stand-by mode includes turning the compressor off.

2. The method according to claim 1 wherein determining a power limit value includes determining the power limit value based on an optimization between fuel cell stack power and battery power.

3. The method according to claim 2 wherein the optimization between the fuel cell stack power and battery power includes an optimization for charging the battery using fuel cell stack power until the battery reaches a predetermined battery state-of-charge.

4. The method according to claim 1 wherein entering a dynamic stand-by mode includes delaying the time that the system enters the dynamic stand-by mode from when the system power request falls below the power limit value.

5. The method according to claim 4 wherein delaying the time includes delaying the time the system enters the dynamic stand-by mode from 1-2 seconds.

6. The method according to claim 1 further comprising exiting the system stand-by mode when the system power request rises above the power limit value.

7. The method according to claim 1 wherein the compressor includes air bearings.

8. The method according to claim 1 where the fuel cell system is on a vehicle.

9. A method for operating a fuel cell system in a system stand-by mode, said fuel cell system including a fuel cell stack, a high voltage battery and a compressor that provides cathode air to a cathode side of the fuel cell stack, said method comprising:
    determining a power limit value when a system power request falls below the power limit value the system will enter the system stand-by mode, wherein the power limit value is determined based on an optimization between fuel cell stack power and battery power that includes using the fuel cell stack power to charge the battery so that the battery state-of-charge is at a predetermined value;
    determining that the system has fallen below the optimization power limit value;
    entering a dynamic stand-by mode after a predetermined time period has passed from when the system power request falls below the optimization power limit value where the fuel cell stack is turned off and the compressor is operated at an idle speed, wherein entering the dynamic stand-by mode includes delaying the time that the system enters the dynamic stand-by mode from when the system power request falls below the power limit value;
    accumulating a compressor power value identifying how much energy has been consumed by operating the compressor at the idle speed;
    entering a static stand-by mode when the accumulated compressor power value reaches a compressor restart value that identifies how much energy it takes to start the compressor, wherein entering the static stand-by mode includes turning the compressor off; and
    exiting the stand-by mode when the power request rises above the optimization power limit value.

10. The method according to claim 9 wherein delaying the time includes delaying the time the system enters the dynamic stand-by mode between 1-2 seconds.

11. The method according to claim 9 wherein the compressor includes air bearings.

12. The method according to claim 9 where the fuel cell system is on a vehicle.

13. A control system for operating a fuel cell system in a system stand-by mode, said control system comprising:
    means for determining a power limit value when a system power request falls below the power limit value the system will enter the system stand-by mode;
    means for determining that the system power request has fallen below the power limit value;
    means for entering a dynamic stand-by mode where a fuel cell stack in the fuel cell system is turned off and a compressor providing cathode air to a cathode side of the fuel cell stack is operated at an idle speed;
    means for accumulating a compressor power value identifying how much energy has been consumed by operating the compressor at the idle speed during the dynamic stand-by mode; and
    means for entering a static stand-by mode when the accumulated compressor power value reaches a compressor restart energy value that identifies how much energy it takes to start the compressor, wherein entering the static stand-by mode includes turning the compressor off.

14. The control system according to claim 13 wherein the means for determining a power limit value determines the power limit value based on an optimization between fuel cell stack power and battery power.

15. The control system according to claim 14 wherein the optimization between the fuel cell stack power and battery power includes an optimization for charging the battery using fuel cell stack power until the battery reaches a predetermined battery state-of-charge.

16. The control system according to claim 13 wherein the means for entering a dynamic stand-by mode delays the time that the system enters the dynamic stand-by mode from when the system power request falls below the power limit value.

17. The control system according to claim 16 wherein the means for entering a dynamic stand-by mode delays the time the system enters the dynamic stand-by mode from 1-2 seconds.

18. The control system according to claim 13 further comprising means for exiting the system stand-by mode when the system power request rises above the power limit value.

19. The control system according to claim 13 wherein the compressor includes air bearings.

20. The control system according to claim 13 where the fuel cell system is on a vehicle.

* * * * *